US006898608B2

(12) United States Patent
Hopeman et al.

(10) Patent No.: US 6,898,608 B2
(45) Date of Patent: May 24, 2005

(54) TECHNIQUES FOR MANAGING WHAT-IF ANALYSIS OF DATA MANAGED BY A RELATIONAL DATABASE SYSTEM

(75) Inventors: A. A. Hopeman, Arlington, MA (US); James Carey, Brookline, MA (US); Ekrem Soylemez, Arlington, MA (US); Bruce Golbus, Waban, MA (US); Igor Lubashev, Cambridge, MA (US); Zhiqi Qiu, Waltham, MA (US)

(73) Assignee: Oracle International Corporation, Redwood Shores, CA (US)

(*) Notice: Subject to any disclaimer, the term of this patent is extended or adjusted under 35 U.S.C. 154(b) by 66 days.

(21) Appl. No.: 10/417,732

(22) Filed: Apr. 16, 2003

(65) Prior Publication Data
US 2003/0204534 A1 Oct. 30, 2003

Related U.S. Application Data
(60) Provisional application No. 60/375,726, filed on Apr. 26, 2002, and provisional application No. 60/379,870, filed on May 10, 2002.

(51) Int. Cl.[7] .............................................. G06F 17/30
(52) U.S. Cl. ................................... 707/202; 707/104.1
(58) Field of Search .............................. 707/1, 2, 3, 4, 707/5, 6, 7, 8, 9, 10, 100, 101, 103, 104.1, 200, 201, 202; 714/15, 20

(56) References Cited

U.S. PATENT DOCUMENTS

| 5,832,516 | A | | 11/1998 | Bamford et al. ............ 707/202 |
|---|---|---|---|---|
| 5,832,521 | A | | 11/1998 | Klots et al. ................. 707/203 |
| 5,870,758 | A | | 2/1999 | Bamford et al. ............ 707/201 |
| 5,907,848 | A | * | 5/1999 | Zaiken et al. ............... 707/202 |
| 6,078,994 | A | | 6/2000 | Carey ......................... 711/133 |
| 6,173,292 | B1 | * | 1/2001 | Barber et al. ............... 707/200 |
| 6,324,623 | B1 | | 11/2001 | Carey ......................... 711/148 |
| 6,484,179 | B1 | | 11/2002 | Roccaforte ................... 707/62 |
| 6,567,928 | B1 | * | 5/2003 | Lyle et al. ..................... 714/15 |
| 6,587,857 | B1 | * | 7/2003 | Carothers et al. ........... 707/102 |
| 6,618,822 | B1 | * | 9/2003 | Loaiza et al. ................. 714/20 |
| 6,651,073 | B1 | * | 11/2003 | Lyle et al. ................... 707/202 |

OTHER PUBLICATIONS

Oracle Corporation, "Oracle Express Server™ Database Administration Guide, Release 6.0," Part No. A47232–1, 1996, pp. 1–265 (text provided on CD–ROM).
Oracle Corporation, "Oracle OLAP," Data Sheet, 2000–2001, 5 pages.
Sandra Cheevers, Oracle Corporation, "Oracle9i Database Summary," An Oracle White Paper, May 2002, pp. 1–35.
Mark Townsend, Oracle Corporation, "Oracle9i New Features Summary," An Oracle White Paper, May 2001, pp. 1–27.
Oracle Corporation, "Oracle9i Database Release 2 New Features," An Oracle White Paper, May 2002, pp. 1–12.

* cited by examiner

Primary Examiner—Diane D. Mizrahi
Assistant Examiner—Yicun Wu
(74) Attorney, Agent, or Firm—Hickman Palermo Truong & Becker LLP; John D. Henkhaus

(57) ABSTRACT

An analytical workspace includes a set of data on which what-if analysis is performed, which is stored persistently and managed in a relational database system. The data may be stored as a binary large object in relational tables, and may comprise a portion of a multidimensional cube. A series of commands on the analytical workspace is received by a database server. In response to the commands, changes are made to the data in temporary storage. Redo information is not generated at this time in association with such changes. Hence, these changes are not made permanent at this time. At some point, the server may receive an update command to make the changes permanent. In response to the update command, redo information is generated for the changes reflected in the temporary storage and the changes are made permanent, in accordance with relational database properties.

27 Claims, 4 Drawing Sheets

RECEIVE A SECOND SERIES OF ONE OR MORE COMMANDS TO CHANGE SECOND DATA MANAGED BY THE RELATIONAL DATABASE SYSTEM, ISSUED FROM A SECOND SESSION IN ASSOCIATION WITH READ ONLY ACCESS
214

IN RESPONSE TO RECEIVING SAID SECOND SERIES OF COMMANDS, MAKE CHANGES TO THE SECOND DATA IN TEMPORARY STORAGE, CONCURRENTLY WITH CHANGES ASSOCIATED WITH A FIRST SERIES OF COMMANDS ISSUED FROM A FIRST SESSION IN ASSOCIATION WITH READ/WRITE ACCESS
216

*FIG. 2B*

TECHNIQUES FOR MANAGING WHAT-IF ANALYSIS OF DATA MANAGED BY A RELATIONAL DATABASE SYSTEM

CROSS REFERENCE TO RELATED APPLICATIONS

This application is related to and claims the benefit of domestic priority under 35 U.S.C. §119(e) from U.S. Provisional Patent Application No. 60/375,726 entitled "Integrating Online Analytical Processing (OLAP) Functions Into A Relational Database Management System (RDBMS)," filed on Apr. 26, 2002; and is related to and claims the benefit of domestic priority under 35 U.S.C. §119(e) from U.S. Provisional Patent Application No. 60/379,870 entitled "Online Analytical Processing (OLAP) Operations and Access Structures for Data Stored in a Relational Database," filed on May 10, 2002; both of which are incorporated by reference in their entirety for all purposes, as if fully set forth herein.

FIELD OF THE INVENTION

The present invention relates generally to database systems and, more specifically, to techniques for managing transactions in a relational database system to improve support for OLAP operations.

BACKGROUND OF THE INVENTION

Historically, there has been a distinction between relational database management systems (RDBMS) and multi-dimensional database management systems (MDDBMS). Each type of system has evolved somewhat independently from the other and to meet different goals. There are many general differences between such systems, including (1) database schema, (2) processes used to store, access and retrieve such data, and (3) data analysis capabilities, to name a few. Many specific differences in the internal processes associated with relational and multidimensional database systems stem from these general differences.

Relational Database Management Systems

Traditional relational database management systems are configured to support relatively many, short transactions. A transaction is a sequence of operations on objects or data items, often embodied in DML (Data Manipulation Language) commands, that satisfies the following four properties (ACID properties):

Atomicity: all the operations of the transaction are performed, or none of them is performed;

Consistency: a transaction must be correct, by transforming the data from one consistent state to another;

Isolation: when several transactions are executed concurrently, each of them must appear as if it is executed alone;

Durability: despite crashes, the effect of the performed operations is permanent.

Due to the way in which database updates are performed to data files in some database systems, at any given point in time, a data file in persistent storage may contain some data blocks that (1) have been tentatively modified by uncommitted transactions and/or (2) do not yet reflect updates performed by committed transactions. Thus, an instance recovery operation must be performed after an instance failure to restore a database to the transaction consistent state it possessed just prior to the instance failure. In a transaction consistent state, a database reflects all the changes made by transactions which are committed and none of the changes made by transactions which are not committed.

Consistency Property

Not only must transactions leave the database in a consistent state upon completion, but transactions must also see the database in a consistent state while they are executing. This condition is difficult to satisfy because there may be concurrently executing transactions, each of which may be causing a temporary inconsistency visible only within that single transaction. Consequently, transactions must not be able to see the changes made by concurrently executing transactions until those transactions commit (i.e. terminate and make their changes permanent).

Relational systems make changes to data as commanded, under the presumption that the changes will eventually be committed. If a failure occurs in the system or the transaction cannot be committed, or made permanent, the system will roll back or undo the changes. That is, all modifications performed up to this point will be undone and the system will revert to its previous state at the beginning of the transaction. Hence, lengthy transactions in a relational system become increasingly expensive due to the possible increasing amount of undo information that is managed over the time of the transaction. Furthermore, during a transaction it is typical for the associated table rows to be write locked until committed or rolled back, prohibiting other sessions from writing to, but not reading from, the row during the transaction time.

With a pending consistent transaction, a query on associated data is relative to the start time of the transaction. Thus, during query processing, one can make changes to data without affecting the query. This concept is referred to as "consistent read." One technique for performing consistent reads is described in U.S. Pat. No. 5,832,521 entitled "Method and Apparatus for Performing Consistent Reads in Multiple-Server Environments", which is incorporated by reference in its entirety for all purposes as if fully disclosed herein.

One approach to ensuring that database readers do not see changes made by concurrently executing transactions involves presenting snapshots of the database to readers. According to the snapshot approach, every version of a data item supplied to a reader transaction belongs to a "snapshot" of the database. A snapshot includes all updates that were committed to the database as of a given time and any updates made by the reader transaction itself, but no updates made by other transactions that were not committed as of that given time. If no such version of a data item actually exists, the version must be derived from an existing version of the data item. One implementation of a snapshot approach is described in U.S. Pat. No. 5,870,758, entitled "Method and Apparatus for Providing Isolation Levels in a Database System", which is incorporated by reference in its entirety for all purposes as if fully disclosed herein.

Undo in a Relational Database System

To derive a version of a data item, the derivation mechanism requires an existing version of the data item and information required to derive the desired version of the data item from the existing version of the data item. The information required to derive a particular version of a data item is hereinafter referred to as "derivation data". In a database system that uses snapshots, the derivation data may include, in addition to an existing version of a data item, transaction state information of the transactions that have updated the data item, and information from undo records associated with the data item.

For example, assume that a data item DATA1 has been updated by three transactions TXA, TXB, and TXC, in that order. TXA and TXB have committed before a time T, and TXC did not commit until time T+1. When a fourth transaction TXD associated with the snapshot time T wishes to read DATA1, the version of DATA1 that reflects all of the updates made to DATA1 (the "current version") cannot be supplied to TXD because the current version of DATA1 reflects changes made by a transaction TXC that committed after time T. However, the changes made by TXC may be removed from DATA1 to produce a "derived" version of DATA1, which may then be supplied to TXD.

Undo records are records that indicate how to undo the changes that were made by transactions during update operations that correspond to the undo records. A derivation mechanism applies the appropriate undo records to the current version of persistent data to generate the desired, derived version of the data. The derived version of the data is typically stored in cache, from which the database server can read the derived version of the data.

Redo in a Relational Database System

In a database server, a memory area is allocated and one or more processes are started to execute one or more transactions. The combination of background system processes and the processes executing transactions is called a database instance.

A buffer cache resides in a portion of the memory area and holds database information. Buffers in the buffer cache hold copies of data blocks that have been read from data files. The buffers are shared by all user processes concurrently connected to the instance. When a transaction desires to make a change to a data block, a copy of the data block is loaded into a buffer and the change is made to the copy of the data block stored in the database buffer cache in dynamic memory. Afterwards, a database writer writes the modified blocks of data from the database buffer cache to the data files on disk.

The memory area also contains a redo log buffer. A redo log buffer holds information about update operations recently performed by transactions. This information is stored in redo entries. Redo entries contain the information necessary to reconstruct, or redo, changes made by operations such as INSERT, UPDATE, DELETE, CREATE, ALTER, or DROP operations for example. Redo entries are generated for each change made to a copy of a data block stored in the database buffer cache. The redo log buffer is written to an active online redo log file group on disk by a background process. The records in the online redo log file group on disk are referred to as redo logs.

A typical DBMS performs several steps during an instance recovery. First, the DBMS rolls forward, or reapplies to the data files all of the changes recorded in the redo log. Rolling forward proceeds through as many redo log files as necessary to bring the database forward in time to reflect all of the changes made prior to the time of the crash. Rolling forward usually includes applying the changes in online redo log files, and may also include applying changes recorded in archived redo log files (online redo files which are archived before being reused). After rolling forward, the data blocks contain all committed changes as well as any uncommitted changes that were recorded in the redo log prior to the crash.

The use of redo logs during recovery are described in detail in U.S. Pat. No. 5,832,516 entitled "Caching Data In Recoverable Objects", which is incorporated by reference in its entirety for all purposes as if fully disclosed herein.

Rollback segments include records, e.g., undo records, for undoing uncommitted changes made during the roll-forward operation. As mentioned, in database recovery, the information contained in the rollback segments is used to undo the changes made by transactions that were uncommitted at the time of the crash. The process of undoing changes made by the uncommitted transactions is referred to as "rolling back" the transactions.

Multidimensional Database Management Systems

As mentioned, traditional multidimensional database management systems, sometimes referred to as OLAP systems, are fundamentally different than a RDBMS. A primary feature of multidimensional systems is the ability to perform predictive analytical functions such as forecasting, modeling, allocations and consolidations, and scenario management on multidimensional data. Such systems are built on the presumption of long transactions involving iterations of data change and examination.

A useful MDDBMS guarantees read repeatability to the beginning of a given session and allows for long sessions that incur limited performance degradation. Read repeatability ensures that one only sees the effect of private changes to data, not the effect of changes of others. Consequently, running a MDDBMS in a multi-threaded computing environment has its challenges. Approaches to such challenges are described in U.S. Pat. No. 6,078,994 entitled "System for Maintaining a Shared Cache in a Multi-Threaded Computer Environment" and U.S. Pat. No. 6,324,623 entitled "Computing System for Implementing a Shared Cache", both of which are incorporated by reference in their entirety for all purposes as if fully disclosed herein.

OLTP and OLAP Operations

One significant difference between relational and multi-dimensional database systems is the difference in their respective transaction models and operation of associated transaction engines. Generally, relational systems and processes are modeled to provide fast and efficient loading and revising of data, whereas multidimensional systems and processes are modeled to provide fast, complex real-time analytical processing of data. Furthermore, relational systems are modeled to support many short transactions, or sequences of operations, that are almost always committed. That is, the changes made by transactions executed in a relational database system are almost always made permanent to the database.

In contrast, multidimensional systems are modeled to support long transactions that frequently are not committed. This is, the changes made by transactions executed in multidimensional system are usually temporary, only visible to the transaction that is making the changes, and must be removed from the database after the transaction terminates.

Large-scale data transaction processing, which is typically associated with relational systems, is often referred to as OLTP (On-Line Transaction Processing). Real-time analytical processing of data is often referred to as OLAP (On-Line Analytical Processing), and with respect to multidimensional data, MOLAP (Multidimensional On-Line Analytical Processing).

Not only do relational and multidimensional database systems meet different needs, in addition, such systems have historically been configured as separate stand-alone systems. In some instances, such systems are configured with interface data constructs and processes in attempts to emulate the functionality of one type of system in the other type of system. For example, U.S. Pat. No. 6,484,179 describes techniques for organizing multidimensional data in a relational database system in a manner that improves the performance of OLAP operations within the relational database system.

However, in prior approaches, the two disparate systems are not truly integrated. Prior approaches do not provide efficient large-scale analytical processing of transactions on relationally stored data, while maintaining desired properties of such data. For example, prior approaches do not provide the ability to efficiently handle multi-session what-if analysis transactions (e.g., MOLAP transactions) on relationally managed data, while maintaining the ACID (atomicity, consistency, isolation, durability) transaction properties typically associated with relationally managed data. What-if analyses are popular scenarios in data warehouse environments, particularly for assimilation of data in a business decision-making context. A data warehouse is a consolidated view of enterprise data, optimized for reporting and analysis. Basically, a data warehouse is an aggregated, sometimes summarized copy of transaction and non-transaction data specifically structured for dynamic querying, analysis and reporting.

Based on the foregoing, there is a clear need for techniques for handling what-if analysis of data managed in a relational database system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B is a flow diagram that illustrates a method for managing what-if analysis of data managed in a relational database management system.

DETAILED DESCRIPTION

Figure 1:
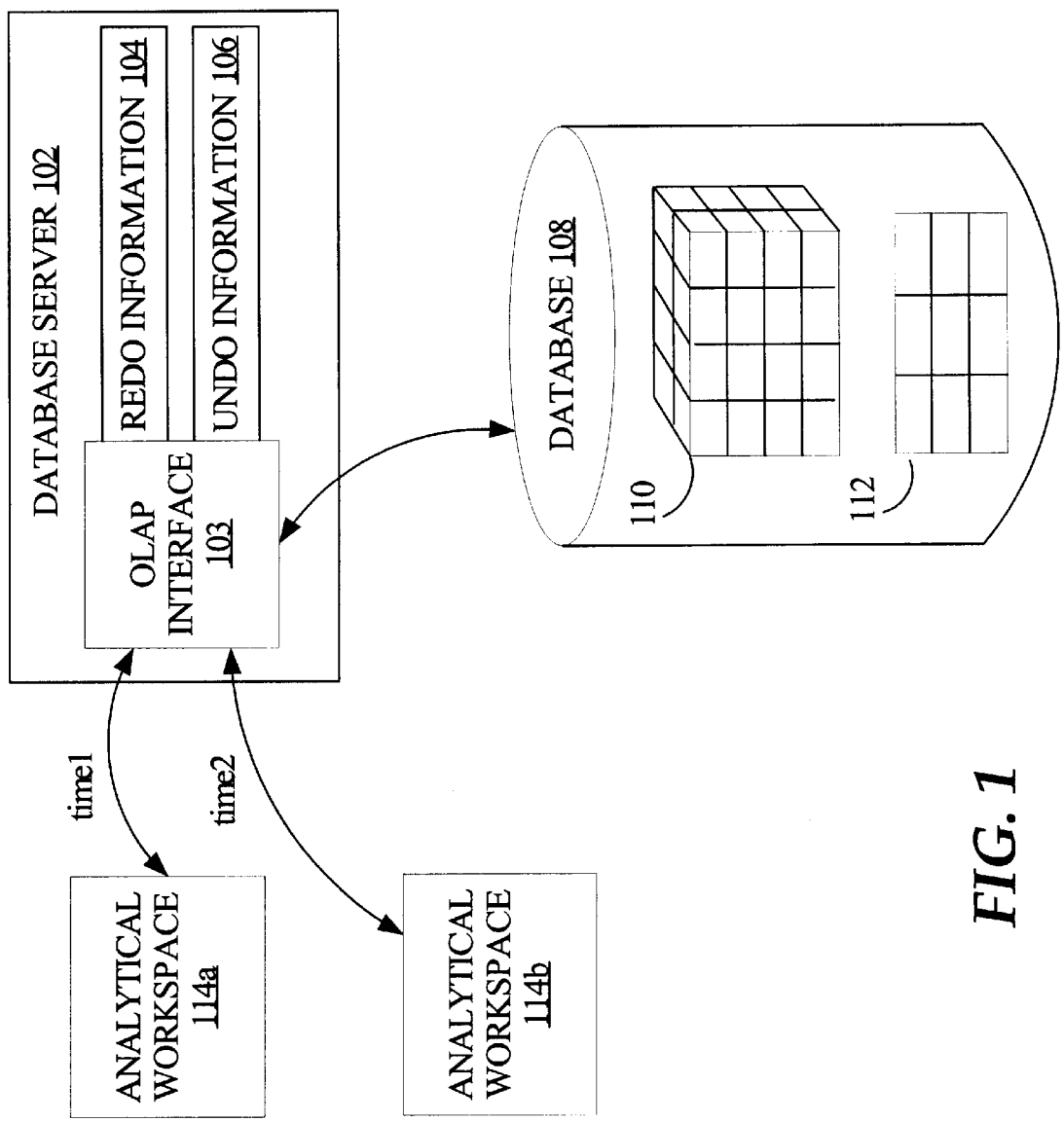
FIG. 1 is a block diagram that illustrates an operating environment in which embodiments of the invention may be implemented.

Techniques are described for managing transactions performed on data managed by a relational database system to more efficiently support OLAP operations. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OLAP in a Relational Database System

Managing on-line analytical processing of data managed in a relational database system presents unique challenges. Such challenges include, for example, (1) allowing multiple database sessions to concurrently access and manipulate the same data; (2) allowing transactions on data managed relationally but which may never be made permanent, e.g., what-if scenarios; (3) managing undo and redo information associated with what-if data transactions; and (4) managing computational resources associated with a database system. Therefore, embodiments are described herein which meet the foregoing challenges, either individually or in combination.

Analytical Workspaces

An analytical workspace provides multidimensional structures that are compatible with multidimensional database objects such as dimensions, variables, formulas, relations, and valuesets. Analytical workspaces can persist across sessions and be shared by multiple user sessions. In the context of what-if analyses, an analytical workspace includes a set of data being analyzed. In an embodiment, the data underlying an analytical workspace is stored persistently in relational database tables. Furthermore, the data may be stored as a binary large object in such tables, and may comprise a portion of a multidimensional cube.

New Transaction Model Overview

Techniques are provided in which a new transaction model is used to more efficiently handle OLAP operations performed on data managed by a relational database system. According to one embodiment, a read-write transaction may go through three phases. During the first phase (the "temporary change" phase), it is assumed that the changes that are made by the transaction will not be made permanent to the database. Consequently, no redo or undo information is generated for changes while they are being made. Instead, any data that is (1) changed by the transaction, and (2) stored back to persistent storage, is stored separately from the database data itself, in a portion of persistent storage that is designated as "temporary".

If the read-write transaction issues a command to make the changes permanent to the database, then a second phase (the "execute transaction" phase) begins. During the execute transaction phase, a relational database transaction is executed to change the data in the relational database to reflect the changes made during the temporary change phase. As part of the execute transaction phase, redo and undo information is generated as necessary to ensure database consistency. Specifically, for any changes that are flushed to persistent storage prior to commit, undo information is stored on persistent storage to ensure that the changes can be removed if the transaction does not commit. Similarly, for any changes that have still not been stored to persistent storage at the time of commit, redo information is stored on persistent storage prior to commit to ensure that the changes will be reflected in the database even if a crash occurs before the changes are flushed to disk.

Furthermore, a third phase (the "make permanent" phase) is executed. During the make permanent phase, the changes that have already been made during the temporary change phase and moved under RDBMS transaction control during the execute transaction phase, are made permanently to the database. In other words, the transaction executed during the execute transaction phase is committed.

New Transaction Model Example

As explained above, using the techniques described herein, a read-write transaction can go through three distinct phases. As an example, assume that a user attaches to a database, and acquires an analytical workspace in read-write mode. The database server that manages the database then receives a series of commands to perform operations on data within the analytical workspace. If the user is performing a what-if analysis, such commands may make changes to the associated data that the user may not intend to make permanent to the database.

Initially, the temporary change rules apply to changes made by the transaction. Consequently, in response to the commands, changes are initially made to the data in storage that is disassociated with the original data. For example, changes are made to a copy of the original data and stored in a portion of persistent storage designated as temporary.

Significantly, redo information is not generated at this time in association with such changes. Even when the changed data are stored to persistent storage, the changed data are stored separate from the unchanged version of the data, and no undo information is generated. Hence, if a failure occurs, there are no undo records for removing the uncommitted changes from persistent storage. However, because the changes were stored on a portion of persistent storage that was designated as temporary storage, the changes do not have to be removed from the database.

Temporary changes to data in the analytical workspace can be canceled by ending the what-if consideration of the specific analytical workspace. In one embodiment, cancellation is enacted by "detaching" the analytical workspace by issuing one or more commands that remove the analytical workspace from what-if consideration.

On the other hand, if the user desires to make the changes permanent, the user may issue an update command to the server to make the changes permanent. In response to the update command, the execute transaction phase is initiated. During the execute transaction phase, a relational database transaction is executed to begin updating the data to reflect the changes in temporary storage. During these updates, redo and/or undo information is generated for data consistency purposes. If changes to the analytical workspace are canceled at this point in the process, changes already executed via the transaction are not affected. To undo such changes, the transaction needs to be rolled back prior to the point in time at which the update command was issued.

Data in the analytical workspace can be further changed following issuance of the update command and moved to the transaction via a subsequent update command. This process can continue indefinitely until a commit command is issued, at which point the make permanent phase begins. During the make permanent phase, the changes that have been updated into relational storage during the execute transaction phase are committed to disk. At this point in the process, all redo information is guaranteed to be written to disk, thus making the changes permanent.

One can work with multiple analytical workspaces concurrently. Hence, one may update temporary changes from only one analytical workspace to the relational transaction while keeping temporary the temporary changes to another analytical workspace. Subsequently, further temporary changes to the one analytical workspace or to other analytical workspaces can be updated to the same relational transaction.

Read-Write and Read-Only Transactions

In an embodiment, a single user can acquire a given analytical workspace in read/write mode without preventing others from concurrently possessing the same workspace, or an overlapping workspace, in read only mode. All such users can perform independent what-if analysis on their respective analytical workspaces through issuance of commands. In such embodiment, the database server only responds to update commands that come from a read/write session, for a read/write session locks others from writing to the analytical workspace.

Copy-on-Write

According to one embodiment, during the temporary change phase of a transaction, changes made to a given analytical workspace may be made according to copy-on-write technique. Specifically, when a change is performed to a block using copy-on-write, the original block remains unchanged. Instead, a copy of the block is created and updated to reflect the change. According to one embodiment, copy-on-write functionality is applicable to both read/write and read-only sessions. Therefore, multiple private, non-conflicting workspaces are provided which adhere to consistent read properties.

Operating Environment

FIG. 1 is a block diagram that illustrates an operating environment in which embodiments of the invention may be implemented.

The operating environment includes a database server 102 and a database 108. Database server ("server") 102 comprises one or more computer programs or other software elements for implementing functions described herein. Database 108 is communicatively coupled to server 102 and is a repository for storing data, metadata and other information.

In one embodiment, database 108 stores one or more multidimensional cubes 110. A multidimensional cube ("cube") 110 is an abstract data construct that represents multidimensional data. In the context of database systems, a "dimension" is a list of values that provide categories for data. Dimensions offer a concise and intuitive way of organizing and selecting data for retrieval, updating, and performing calculations. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as multidimensional data.

In one embodiment, database 108 stores relational database tables such as table 112. Furthermore, in one embodiment, database 108 stores both multidimensional cubes 110 and relational tables 112. Hence, in such an embodiment, database 108 is part of a RDBMS that is capable of storing, managing and manipulating relational and multidimensional data and that provides structures and access techniques specifically designed for multidimensional data.

In one embodiment, database server 102 includes an OLAP interface 103, which is an application that is specially built to interact with the multidimensional data, such as cube 110. OLAP interface 103 is able to interpret the multidimensional data which, in one embodiment, is stored as one or more BLOBs in a database table, such as table 112 of database 108. Additionally, OLAP interface 103 may present to a user a specialized user interface that facilitates what-if analysis of data managed in a RDBMS, such as server 102 and database 108.

At times during processing data transactions, database server 102 and possibly database 108 include redo information 104 and undo information 106, the conventional uses of which are previously described. Redo information 104 and undo information 106 allow server 102 to process transactions in accordance with the ACID properties previously described.

Illustrated in FIG. 1 are analytical workspaces ("AW") 114a, 114b. As mentioned, an analytical workspace is a construct that provides multidimensional structures that are compatible with multidimensional database objects such as dimensions, variables, formulas, relations, and valuesets. Therefore, an analytical workspace includes a set of data that can be changed and analyzed in a what-if scenario. Analytical workspaces can be persisted across sessions and shared by multiple user sessions, as illustrated in FIG. 1 by showing AW 114a being acquired at time1 and AW 114b being acquired at time2. Time1 and time2 can be different times, and AW 114a and AW 114b can be acquired by different users via different database sessions and instances. Furthermore, AW 114a and AW 114b may comprise the same data or portions thereof. In an embodiment, analytical workspaces are acquired from database 102 via procedures associated with OLAP interface 103 of server 102.

In an embodiment, analytical workspaces 114a, 114b provide read repeatability to the beginning of a given session, whereby one only sees the private changes made and not the changes of others. In an embodiment, analytical workspaces can be acquired with either read/write or read only capabilities. In both cases, a user can perform what-if analysis on the respective analytical workspace. However, the read/write workspace owns the lock on the data and, therefore, is the only workspace that can make changes permanent.

Method for Managing What-If Analysis of Data Managed In RDBMS

Figure 2A:
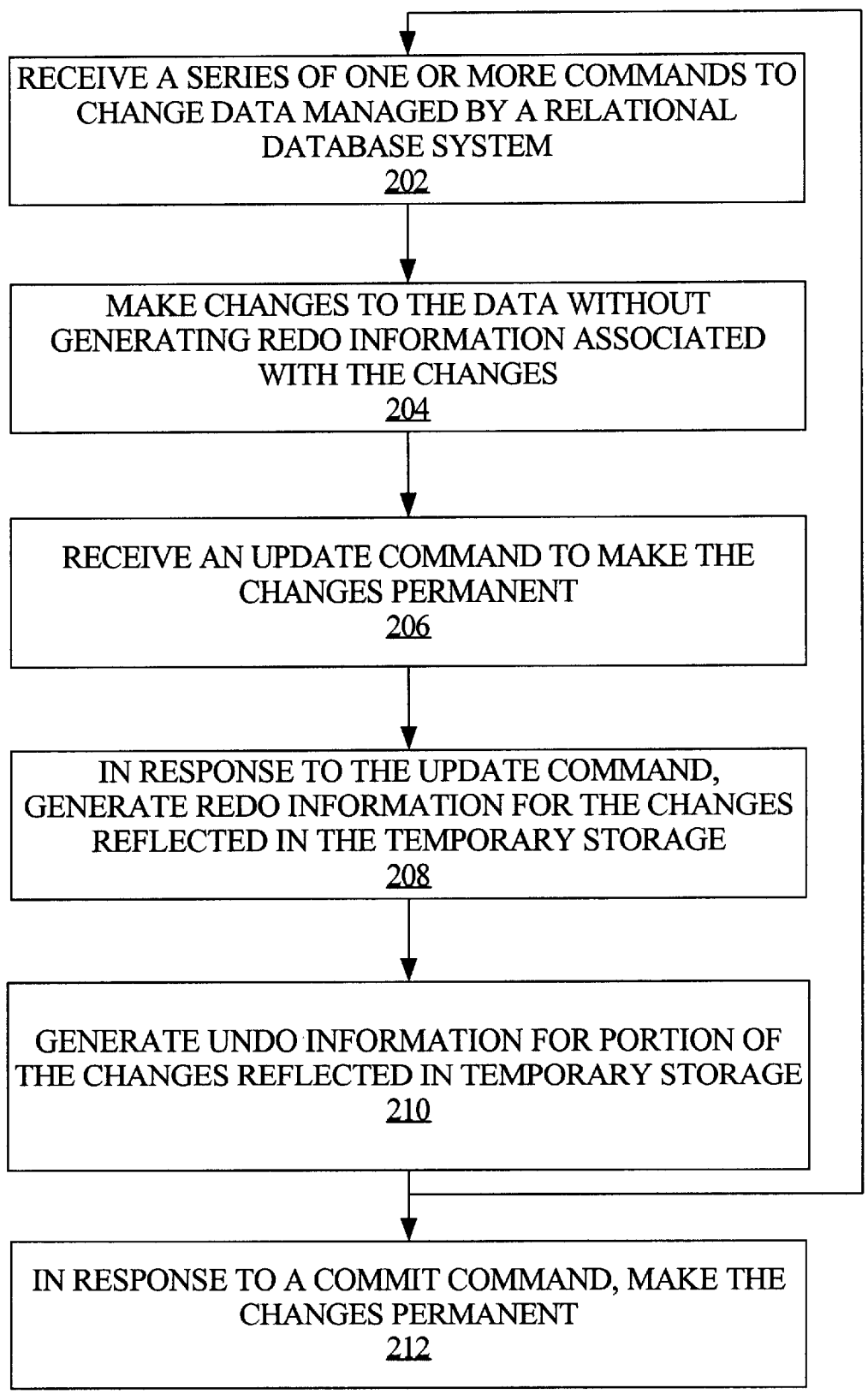
FIG. 2A is a flow diagram that illustrates a method for managing what-if analysis of data managed in a relational database management system.

FIG. 2A is a flow diagram that illustrates a method for managing what-if analysis of data managed in a relational database management system. Such a method is performed, for example, by a database server. The method illustrated in FIG. 2A integrates beneficial features of transaction management used by conventional relational database systems with beneficial features of transaction management used by conventional multidimensional database systems.

For the purpose of explanation, it shall be assumed that a user acquires a read/write access to an analytical workspace, such as analytical workspace 114a (FIG. 1), from a relational database, such as database 108 (FIG. 1). The analytical workspace 114a may correspond to portions of one or more Binary Large Objects (BLOBS) stored in a relational table. The analytical workspace may be copied from persistent storage to dynamic memory. The read/write lock locks the analytical workspace BLOB, however, it does not lock the table rows in which those BLOBs reside. Furthermore, the BLOBs are randomly accessible so it is not necessary to read and copy an entire BLOB in order to acquire access to an associated analytical workspace.

At block 202, a series of one or more commands is received. For example, an OLAP Assignment statement or similar command is received from a user. The received commands change data managed by the RDBMS, via OLAP DML commands, for example. The user may make a series of changes characterized as on-line analytical processing, effectively performing what-if analysis of the data associated with the analytical workspace. The analysis may be relative to, for example, forecasting, modeling, or scenario management on multidimensional data.

Initially, the database server handles that transaction according to the temporary-change rules. Thus, at block 204, in response to receiving the series of commands, changes to the data are made in temporary storage, without generating redo information associated with the changes. In one embodiment, analytical workspaces are implemented with copy-on-write functionality, which is previously described. The dynamic memory to which the copy is made is private to the given user, however, it may be a privately allocated portion of a larger shared memory, such as a buffer cache.

During the temporary change phase of the transaction, a user can make multiple temporary changes to the copy of data in the private dynamic memory space, such as to analytical workspace 114a (FIG. 1), and analyze associated results, without affecting the content of analytical workspace 114b (FIG. 1). Furthermore, multiple changes can be made to a set of data over a relatively long transaction period without making such changes permanent and, therefore, without affecting the common persistent storage of such data and with limited impact on the performance of the database system. Such analytical workspace transactions may reference relationally managed data, which is subject to the relational transaction model and associated ACID properties, other than the multidimensional data. However, once such data is copied into an analytical workspace, it is no longer subject to the ACID properties. Therefore, analytical workspace transactions are not subject to the ACID properties associated with relational transactions during the temporary change phase of the transaction.

At block 206, a command is received to make the changes permanent. For example, an update command is received from a user. In response to the command, the database server copies pending temporary changes into an RDBMS transaction via a series of RDBMS DML commands. For example, at block 208 redo information is generated for the changes reflected in the temporary storage. Once the redo information is generated, the associated data changes are now effectively part of an RDBMS transaction, which adheres to the ACID properties previously described. Hence, if the transaction commits before a crash, the database can be rolled forward, based on the redo records, to include the changes. Conversely, if a crash occurs before the transaction commits, the database can be rolled back to remove the changes that were made persistent during the "make permanent" phase prior to the crash.

At block 212, when all the changes have been processed during the make permanent phase, the data changes are made permanent in response to a commit command. Hence, the changes reflected in the temporary storage are made persistent in database 108 (FIG. 1), according to an RDBMS transaction model. Effectively, the transaction is committed, in the context of an RDBMS.

A significant benefit of the process is that OLAP analytical workspace changes and relational data changes can be combined in a single relational database transaction, i.e., a relationally managed transaction. For example, the same transaction that contains operations that update an analytical workspace may also contain operations that update data in a relational table that exists outside the workspace. Using the techniques described herein, the changes to the analytical workspace, along with the changes to the relational data, will all be applied (or not applied) as an atomic unit of work.

In an embodiment, the changed data is represented as one or more BLOBs in a relational database table, such as table 112 of database 108 (FIG. 1). Furthermore, associated changes to underlying data stored in relational tables, such as a dimension table, are made permanent.

In an embodiment, during the make permanent phase, undo information is generated at block 210. Block 210 is performed prior to making the changes permanent at block 212. Hence, the analytical workspace changes are made to fit within the relational transaction model, with the associated ACID properties, and the transaction operations can be rolled back if necessary. As mentioned, optional additional commands to change data may be received at block 202 prior to committing the transaction and the process of blocks 204–210 repeated, as depicted by the line leading from after block 210 to block 202.

In one implementation, a SQL rollback command has no effect on any analytical workspace data if none of the what-if update commands have been rolled back. An example scenario is if there were no update commands issued on a given analytical workspace since the beginning of the execute transaction phase or if the rollback is to a savepoint that is later than the last update for the given analytical workspace. If, however, at least one update has been rolled back, all pending (i.e., not updated) temporary changes to that analytical workspace are discarded. Remaining updated changes, which were copied to the transaction by update commands that have not been rolled back (e.g., in case of a rollback to a savepoint) are still under the relational transaction and are able to be made permanent with a commit command. As such, the data in the analytical workspace after a rollback command that rolled back at least one update command, is as it was right after the latest update command that was not rolled back, or the beginning of the relational transaction if all updates have been rolled back.

In an alternative implementation, after a rollback command is issued, the data in an analytical workspace is as it was right before the earliest rolled back update command. In contrast to the preceding implementation, the analytical workspace would contain all temporary changes made since the latest update that was not rolled back.

In another alternative implementation, a separate analytical workspace form of savepoint is implemented. This form of savepoint performs both a conventional relational savepoint operation as well as apply a savepoint to the analytical workspace context. In this form, the rollback command releases all updates to the savepoint, and rolls back all temporary changes to the last analytic savepoint before the rollback savepoint or to the previous update, whichever is later.

FIG. 2B is a flow diagram that illustrates a method for managing what-if analysis of data managed in a relational database management system, according to embodiments of the invention. The method of FIG. 2B illustrates an optional continuation of the method of FIG. 2A.

In the context of the method of FIG. 2A, the series of commands received at block 202 is a first series of commands issued on first data from a first session, in association with a read/write data access. At block 214, a second series of one or more commands is received, which is issued from a second session, in association with a read only data access. Changes to second data managed by the relational database system are commanded by the second series of commands. Therefore, this embodiment supports concurrent database sessions having different modes of access to data, i.e., read/write and read only. Furthermore, in one embodiment, at least a portion of the data changed in the first session overlaps with at least a portion of the data changed in the second session. That is, both sessions have access to and can change the same data. For example, AW 114*a* and AW 114*b* (FIG. 1) comprise some of the same data that is retrieved from database 108 (FIG. 1). If the second session begins its OLAP session (e.g., attaches analytical workspace such as AW 114*b*) before the first session (e.g., AW 114*a*) commits its updated changes, the second session will not see the changes made by the first session unless the second session is aborted and an new session started. Hence, consistent views of data in respective analytical workspaces are ensured. That is, the data is in a consistent state among the two sessions and associated analytical workspaces.

At block 216, in response to receiving the second series of commands, changes are made to the second data in temporary storage. In an embodiment, changes made to the second data, which are associated with the second session, are made concurrently with changes made to the first data, which are associated with the first session. Hence, concurrent database sessions can make changes to data concurrently. The respective changes are made to copies in respective private memory space without affecting the other copy.

As mentioned, in one embodiment, at least a portion of the first data overlaps with at least a portion of the second data. In such a scenario, concurrent changes can still be made to copies in respective private memory space without affecting the other copy, partially as a result of copy-on-write functionality. However, only changes from the read/write analytical workspace, e.g., the first commands from the first session, are able to be made permanent.

Hardware Overview

Figure 3:
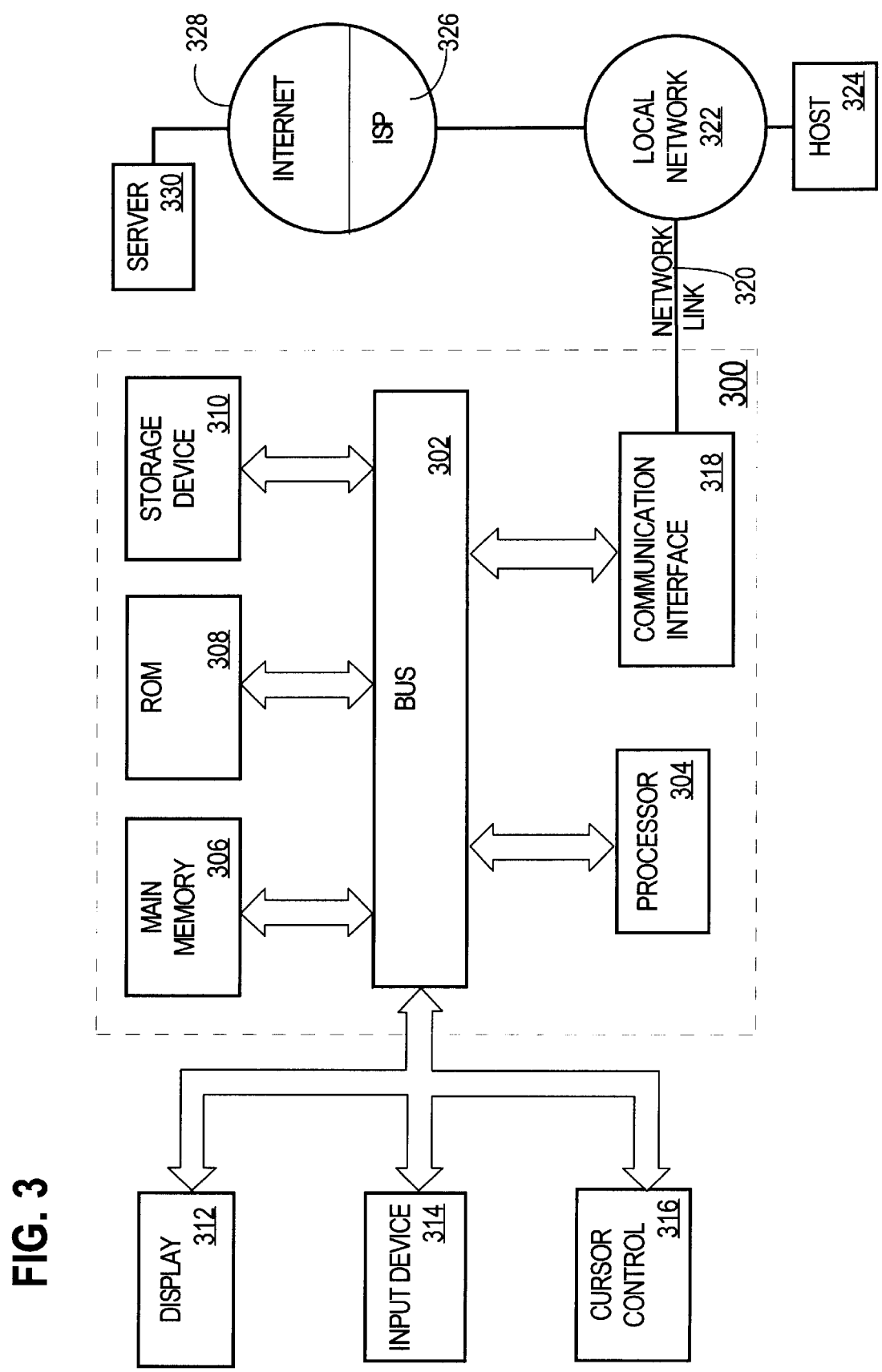
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "Computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for handling transactions that change data managed by a relational database system, the method comprising the computer-implemented steps of:

receiving a series of one or more commands to change data managed by said relational database system;

in response to receiving said series of commands, making changes to said data without generating redo information associated with said changes;

after making said changes, receiving an update command to make permanent said changes; and in response to said update command, executing a transaction on said data in said relational database system to reflect said changes, including generating redo information for said changes.

2. The method of claim 1, further comprising the computer-implemented step of:

after generating redo information for said changes, making said changes permanent in said relational database system.

3. The method of claim 1, wherein the step of making changes to said data includes making changes to said data in temporary storage.

4. The method of claim 2, wherein:

the step of making said changes permanent involves committing said changes as part of a single atomic transaction; and the method further comprises, before committing said transaction, generating undo information for at least a portion of said changes.

5. The method of claim 1, wherein said data is stored on one or more blocks of persistent storage, and wherein the step of making said changes in said temporary storage includes the steps of:

making a copy, in said temporary storage, of at least a portion of said blocks; and making said changes to said copy in said temporary storage.

6. The method of claim 1, wherein said data is stored in one or more relational tables of said relational database system.

7. The method of claim 6, wherein said data is stored as a binary large object in said one or more relational tables.

8. The method of claim 6, wherein said data is at least a portion of a multidimensional cube.

9. The method of claim 6, wherein said step of receiving a series of commands includes receiving said series of commands through an On-Line Analytical Processing (OLAP) user interface.

10. The method of claim 2, wherein said steps of generating redo information and making said changes permanent are performed in response to commands received through an On-Line Analytical Processing (OLAP) application interface to said database.

11. The method of claim 1, wherein said series of commands is a first series of commands issued in association with a read/write data access from a first session, the method further comprising the computer-implemented steps of:

receiving a second series of one or more commands, issued in association with a read only data access from a second session, to change second data managed by said relational database system; and in response to receiving said second series of commands, making changes to said second data.

12. The method of claim 11, wherein the step of making changes to said second data includes making said changes to said second data concurrently with said changes associated with said first series of commands.

13. The method of claim 12, wherein said changes to said second data change at least a portion of data that is also changed in the first session in response to said first series of commands, and wherein said changes to said second data are independent of said changes associated with first series of commands.

14. A computer-readable medium carrying one or more sequences of instructions which, when executed by one or more processors, causes the one or more processors to perform the method recited in claim 1.

15. A computer-readable medium carrying one or more sequences of instructions which, when executed by one or more processors, causes the one or more processors to perform the method recited in claim 2.

16. A computer-readable medium carrying one or more sequences of instructions which, when executed by one or more processors, causes the one or more processors to perform the method recited in claim 3.

17. A computer-readable medium carrying one or more sequences of instructions which, when executed by one or more processors, causes the one or more processors to perform the method recited in claim 4.

18. A computer-readable medium carrying one or more sequences of instructions which, when executed by one or more processors, causes the one or more processors to perform the method recited in claim 5.

19. A computer-readable medium carrying one or more sequences of instructions which, when executed by one or more processors, causes the one or more processors to perform the method recited in claim 6.

20. A computer-readable medium carrying one or more sequences of instructions which, when executed by one or more processors, causes the one or more processors to perform the method recited in claim 7.

21. A computer-readable medium carrying one or more sequences of instructions which, when executed by one or more processors, causes the one or more processors to perform the method recited in claim 8.

22. A computer-readable medium carrying one or more sequences of instructions which, when executed by one or more processors, causes the one or more processors to perform the method recited in claim 9.

23. A computer-readable medium carrying one or more sequences of instructions which, when executed by one or more processors, causes the one or more processors to perform the method recited in claim 10.

24. A computer-readable medium carrying one or more sequences of instructions which, when executed by one or more processors, causes the one or more processors to perform the method recited in claim 11.

25. A computer-readable medium carrying one or more sequences of instructions which, when executed by one or more processors, causes the one or more processors to perform the method recited in claim 12.

26. A computer-readable medium carrying one or more sequences of instructions which, when executed by one or more processors, causes the one or more processors to perform the method recited in claim 13.

27. An apparatus for managing what-if analysis of data managed by a relational database system, the apparatus comprising:

means for receiving a series of one or more commands to change data managed by said relational database system;

means for making changes to said data, in response to receiving said series of commands, without generating redo information associated with said changes;

means for receiving an update command to make permanent said changes; and means for executing a transaction on said data in said relational database system to reflect said changes, including means for generating redo information for said changes, in response to said update command.

* * * * *